United States Patent [19]

Goodby et al.

[11] Patent Number: 4,867,539
[45] Date of Patent: Sep. 19, 1989

[54] FERROELECTRIC LIQUID CRYSTAL DEVICES

[75] Inventors: John W. Goodby, Berkeley Heights; Jayantilal S. Patel, Scotch Plains, both of N.J.

[73] Assignees: American Telephone and Telegraph Company; AT&T Bell Laboratories, both of Murray Hill, N.J.

[21] Appl. No.: 277,457

[22] Filed: Nov. 23, 1988

Related U.S. Application Data

[63] Continuation of Ser. No. 791,918, Oct. 28, 1985, abandoned.

[51] Int. Cl.$^4$ .................. G02F 1/137; C09K 19/06
[52] U.S. Cl. .................. 350/350 S; 252/299.67; 350/346
[58] Field of Search .................. 350/346, 350 R, 350 S; 252/299.67

[56] References Cited

U.S. PATENT DOCUMENTS

| 4,009,934 | 3/1977 | Goodwin et al. | 350/346 |
| 4,447,132 | 5/1984 | De Zwart | 350/346 |
| 4,613,209 | 9/1986 | Goodby et al. | 350/350 S |
| 4,615,586 | 11/1986 | Geary et al. | 350/350 S |

Primary Examiner—Bruce Y. Arnold
Assistant Examiner—Martin Lerner
Attorney, Agent, or Firm—Bruce S. Schneider

[57] ABSTRACT

Excellent ordering in ferroelectric liquid crystal devices is obtained by utilizing a material having a smectic C phase and no higher temperature orthogonal smetic phases. Ordering is accomplished by the combination of (1) contacting the liquid crystal material in the smectic C phase with an ordering substance and (2) subjecting the liquid crystal material to a slowly varying electric field.

8 Claims, 1 Drawing Sheet

U.S. Patent  Sep. 19, 1989  4,867,539
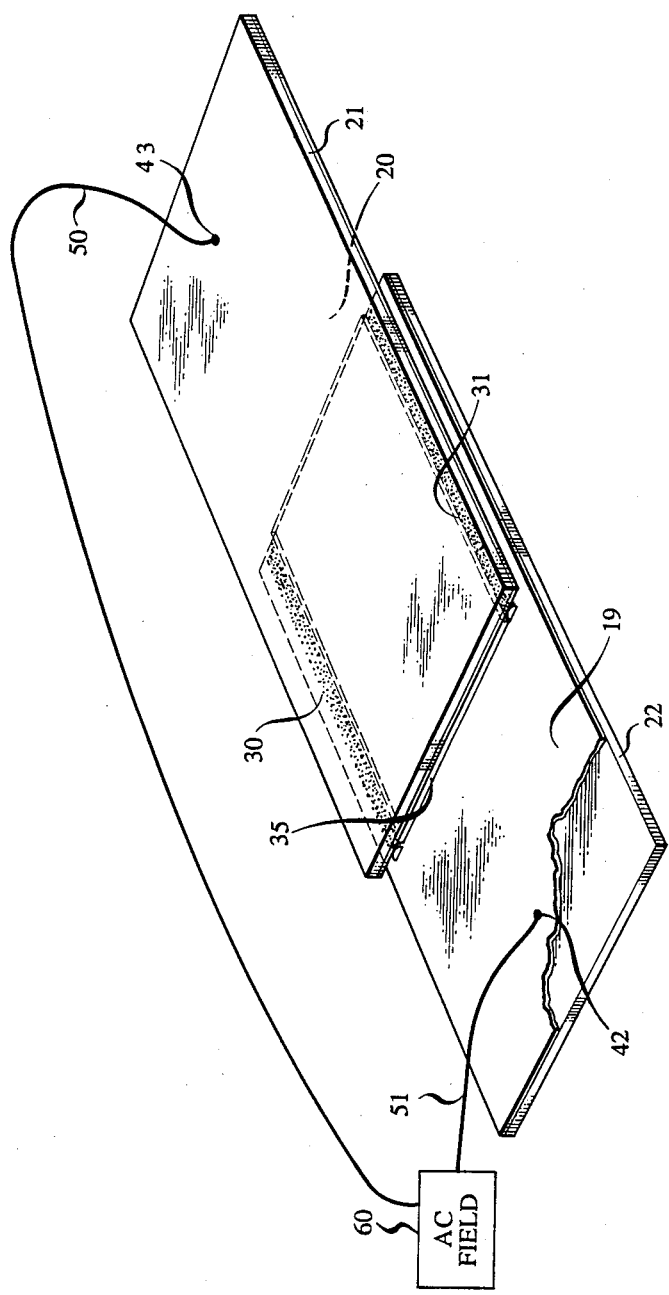

FERROELECTRIC LIQUID CRYSTAL DEVICES

This application is a continuation of application Ser. No. 791,918, filed on Oct. 28, 1985 now abandoned.

BACKGROUND OF THE INVENTION

1. Field of the Invention

This invention relates to optical devices and, in particular, to optical devices utilizing liquid crystal materials.

2. Art Background

Liquid crystal based devices are widely used to display information and are also employed for other applications such as light shutters. These devices, in general, have at least two optical states that depend on the molecular orientation of the liquid crystal material. At least one of these optical states is typically associated with a spatial ordering of the molecules. This ordering is most often changed through the application of an electric field to yield a second molecular spatial configuration, and thus, a second optical state.

For devices utilizing chiral ferroelectric liquid crystal materials, generally the liquid crystal is employed in a smectic C phase. In this phase, one optical device state is associated with molecules aligned in spatially parallel layers. The degree of layer parallel alignment is the sole influence on liquid crystal contrast, and indeed this contrast is an effective measure of the degree of alignment. Poorer alignment leads to poorer contrast. For example, liquid crystal contrast ratios required for many applications, i.e., ratios better than 2:1, are not attainable when alignment is significantly degraded. (Liquid crystal contrast ratio is the ratio of the highest and lowest transmission intensity observed when the device is rotated between crossed polarizers where the wavelength of light utilized for this measurement is chosen so that the optical path difference is either approximately half the wavelength or half an integral number of wavelengths. See *Crystal and the Polarizing Microscope*, 4th Edition, N. Hartshorne and A. Stuart, page 126, Edward Arnold (Publishers) Ltd., London, for a definition of path difference.)

The desired spatial ordering is typically not inherent in any liquid crystal material. Various techniques have been employed to obtain such ordering in a variety of liquid crystal phases. For example, a disordered liquid crystal material is contacted with an order-inducing substance. This order-inducing substance is usually incorporated into the device cell and continually contacts the liquid crystal material. The cell with its ordering substance and liquid crystal material is generally constructed by forming electrodes on a confinement means, e.g., a relatively transparent material such as a glass plate. (The electrodes are employed to apply the necessary fields for optical state switching.) At least a portion of the transparent material on the electrode surface is then covered with the ordering substance. The two treated transparent media, with the ordering material on each facing the other, are spaced a desired distance, e.g., a distance typically in the range 0.5 to 100 $\mu$m, and the region between the plates filled through conventional techniques such as capillary action and vacuum filling.

The ordering of chiral ferroelectric liquid crystal materials, in particular, is not a trivial accomplishment. Various attempted expedients have resulted in undesirable contrast ratios. For example, the device reported by Clark et al, *Applied Physics Letters*, Vol. 36, page 899 (1980), utilizing smectic C liquid cryustal material and a shearing of the liquid crystal material for alignment is suitable only for extremely small areas, i.e., less than 1 cm$^2$. Attempts to improve contrast by aligning ferroelectric liquid crystal material under the combined influence of an ordering substance and an electric field or magnetic field have yielded unacceptable contrast. (See Kondo et al, *Japanese Journal of Applied Physics*, Vol. 22 (1), page L13 (1983), and M. Petrov and L. Komitar, *Crystal Research and Technology*, Vol. 18, page 101 (1983).) Thus, significant improvement in contrast through an associated improvement in spatial ordering is certainly desirable.

SUMMARY OF THE INVENTION

Contrast ratios significantly better than 2:1 are achieved with a concomitant improvement in device contrast by a specific combination of expedients. In particular, a chiral ferroelectric liquid crystal material having, at a temperature higher than the smectic C phase, no orthogonal smectic phase (a smectic phase having the molecules orthogonal to the layer planes) is employed together with an ordering material and a slowly varying applied electric field. (See U.S. patent application Ser. No. 518,640, filed July 29, 1983, now U.S. Pat. No. 4,561,726 issued Dec. 31, 1985 which is hereby incorporated by reference, for suitable ordering materials.) The electric field is applied to the ferroelectric liquid crystal material in its smectic C phase, and excellent ordering is produced.

BRIEF DESCRIPTION OF THE DRAWING

The FIGURE is illustrative of the invention.

DETAILED DESCRIPTION

Spatial ordering is significantly enhanced, i.e., contrast ratios significantly better than 2:1 are obtained, by employing (1) a chiral ferroelectric liquid crystal material having a smectic C phase and having, at a temperature higher than this smectic C phase, no orthogonal smectic phases, (2) an ordering substance, and (3) a slowly varying AC field applied to the smectic C material.

A variety of ordering substances are suitable. For example, those described in U.S. patent application Ser. No. 518,640, filed July 29, 1983, show excellent results. Advantageously, essentially all the ferroelectric liquid crystal material area on at least one of its major surfaces in the electrode region should contact the aligning substance. Contrast is not degraded if the liquid crystal material extends a distance less than its thickness beyond the ordering substance. Although less contact is not precluded, such diminution degrades contrast and is generally undesirable.

In one embodiment, the ordering substance is advantageously applied over each set of electrodes in the form of a thin layer. If a DC field is employed, either both or one of the ordering substance layers is rubbed. When any other electric field gradient is employed in one embodiment, two layers are employed but only one is rubbed. In a second embodiment, irrespective of field employed, only one ordering substance layer is utilized. This layer should, however, be rubbed. In a third embodiment, two ordering substance layers are utilized, and these layers are rubbed so that the angle between the rub direction of the first relative to the second is approximately twice the tilt angle of the liquid crystal smectic C phase.

It is desirable, however, that the presence of the ordering substance does not unacceptably diminish the field strength produced by these electrodes. Although very low field strengths are capable of producing an optical change in liquid crystal materials, typically field strengths on the order of $10^4$ V per cm are desirably utilized. For most practical applications, this field strength is produced with an applied voltage of less than 5 V for ordering substance thicknesses in the range 200 Angstroms to 1 μm. A greater thickness usually attenuates field to an undesirable level, while a thinner layer is difficult to form and often has discontinuities. These discontinuities lead to misalignment and thus low contrast regions of liquid crystal materials. Layers in this thickness range are easily deposited by conventional techniques such as spinning or spraying. (See E. Guyon et al, *Non-Emissive Electro-Optic Displays*, edited by A. R. Kmetz and E. K. Von Willisen, Plenum Press (1976), for a description of such techniques.)

The device should also have certain optical properties. Generally, the transparency of the device in the viewing regions, in the absence of the liquid crystal material but in the presence of the ordering substance, should be 90 percent or greater for light wavelengths in the range 2800 to 7000 Angstroms. The ordering substance generally has these optical properties if thickness suitable to yield the desired field strengths is employed.

To produce the desired ordering, the liquid crystal material is brought, for example by adjusting temperature, to the smectic C phase. (If heating is employed, it is desirable that the ordering substance also be heated so that it does not induce immediate freezing.) The liquid crystal material in the smectic C phase is subjected to a slowly varying AC field. (In the context of this invention, a slowly varying field includes a DC field.) The frequency of the AC field depends on the viscosity of the liquid crystal material, its spontaneous polarization, its elastic constant, and the nature of the ordering substance. Generally, for typical material and device properties, the mean frequency applied during a time sufficient to induce the desired alignment should advantageously be in the range 10 to 100 Hz. (The mean frequency of an applied field is obtained by deconvoluting the waveform into its Fourier components, multiplying the frequency of each component times its amplitude, and dividing the resulting products by the sum of all the amplitudes.) Frequencies between 10 to 100 Hz are suitable for materials having spontaneous polarizations in the range $10^{-9}$ coul/cm$^2$ to $10^{-8}$ coul/cm$^2$ and having elastic constants and viscosities generally similar to representative materials such as (s)-4-n-decyloxyphenyl 4-(3,7-dimethyloctyloxy)benzoate. (Such liquid crystal materials are described in U.S. patent application Ser. No. 727,572, filed Apr. 26, 1985 now U.S. Pat. No. 4,615,586 issued Oct. 7, 1986 and U.S. patent application Ser. No. 361,361, filed Mar. 23, 1982, now U.S. Pat. No. 4,613,209 issued Sept. 23, 1986 both of which are incorporated by reference.) Concomitantly higher frequencies are typically utilized with liquid crystal materials having higher spontaneous polarizations and/or lower viscosities. Similarly, lower frequencies are typically employed with lower spontaneous polarizations and/or higher viscosities.

It is desirable to apply the aligning field to the liquid crystal material while it is in its smectic C phase and while it is within 10 degrees C. of its upper transition temperature to this phase. For suitable frequencies, a time sufficient to produce alignment is typically 30-60 seconds. Generally, the greater the mean frequency, the greater the speed of alignment. However, as previously discussed, if the mean frequency becomes too large, alignment does not occur. Although an atomistic mechanism for this phenomenon is not precisely known, it is contemplated that the inertia of the liquid crystal material molecules is more efficaciously overcome by rapid field change, and thus the necessary molecular movement to transform the bulk material from a disordered to an ordered state is more easily induced. However, if the field change becomes too rapid, the molecule cannot follow this change, and molecular movement is effectively precluded.

The amplitude of the applied field for efficacious alignment should be larger than the unwinding voltage. (The unwinding voltage is a voltage sufficient to remove dechiralization lines in a cell having the same thickness as the device being aligned. Dechiralization lines are defined in M. Glogarova et al, *Czechoslovakian Journal of Physics*, B32, page 943 (1982).) The amplitude of a waveform is the average amplitude of its Fourier components. Although a DC field of appropriate amplitude produces the desired ordering, ordering times are substantially reduced by the use of a suitable field variation.

The means for applying the aligning electric field is not critical. For example, the electrodes utilized for device switching are also employable for alignment. Nevertheless, alignment with electrodes external to the device is not precluded. Irrespective of the means of application, the field direction should advantageously be no greater than 20 degrees measured from a normal to the plane of the device electrodes. Substantially larger angles, although not precluded, cause tilting of the layers so they significantly diverge from being normal to the plane of the device electrodes and cause degradation in device optical properties.

As discussed, after the chiral ferroelectric liquid crystal material is contacted with the ordering substance, it is subjected to an appropriate slowly varying AC field in the smectic C phase. Once alignment is achieved, the aligning AC field need not be maintained to, in turn, maintain alignment.

The following example is illustrative of the invention.

EXAMPLE

Two glass slides measuring approximately 1 inch × ¾ inch and each having one surface coated with indium tin oxide were utilized. These slides were washed in an aqueous detergent solution, rinsed in deionized water, and then freon dried. A solution of 0.5 weight-to-volume percent of 1,4-polybuteleneterephthalate in a 1-to-1 volume mixture of o-chlorophenol and 1,1,2,2-tetrachloroethane was prepared. A few drops of this solution were placed on the indium tin oxide surface of each glass slide. The slides were then spun at a rate of approximately 2,000 rpm to yield a polymeric coating approximately 200 Angstroms thick. The slides were baked at 120 degrees C. for 30 minutes in an air oven. The polymer film of one of the slides was then buffed utilizing a polyester buffing wheel turning at approximately 10 rps. The buffing was accomplished by passing one slide under the buffing wheel at a rate of approximately 1 cm per second. Dry nitrogen was utilized to remove any lint remaining from the buffing procedure.

The slides 21 and 22 were positioned as shown in the FIGURE with the ITO-covered sides, 19 and 20, facing each other. A bead of ultraviolet-curable epoxy was placed between the slides along edges 30 and 31. Sufficient epoxy was utilized so that after curing, the space between the slides was approximately 8 μm. The curing was accomplished by conventional exposure to an ultraviolet light. The cell was heated on a hot stage to approximately 60 degrees C. A sufficient amount of (s)-4-n-decyloxyphenyl 4-(3,7-dimethyloctyloxy)benzoate was placed on the cell at position 35 to allow total filling of the cell through capillary action. The sample was cooled to room temperature, and electrical leads 50 and 51 were attached to each indium tin oxide layer at 43 and 42, respectively.

The cell was again heated on a hot stage to a temperature of 39 degrees C. and maintained at this temperature. A square wave having an amplitude of 50 V AC and a frequency of 15 Hz was applied for source 60 between the electrodes of the cell. The resulting field was maintained for approximately 1 minute.

The cell was placed between cross polarizers. Polarized light was then directed through the first polarizer, through the cell, and through the second polarizer. The transmission measurements were then taken as the cell was rotated relative to the polarizer. The ratio of the maximum to minimum amount of observed transmitted light was greater than 10.

What is claimed is:

1. A process for fabricating a ferroelectric liquid crystal device including a liquid crystal material and electrodes suitable for inducing an observable optical change in said liquid crystal material, said process comprising the steps of:
   (1) contacting said liquid crystal with an ordering substance and
   (2) applying a slowly varying AC field across said liquid crystal material while said liquid crystal material is in a smectic C phase wherein there is an absence in said liquid crystal material of a smectic A phase at a temperature above that of said smectic C phase.

2. The process of claim 1 wherein said liquid crystal material comprises (s)-4-n-decyloxyphenyl 4-(3,7-dimethyloctyloxy)benzoate.

3. The process of calim 2 wherein said slowly varying field has an average frequency in the range 10 to 100 Hz.

4. The process of claim 3 wherein said ordering substance comprises a polyester polymer.

5. The process of claim 1 wherein said slowly varying field has an average frequency in the range 10 to 100 Hz.

6. The process of claim 1 wherein said ordering substance comprises a polyester polymer.

7. The process of claim 1 wherein said liquid crystal material comprises (s)-4-n-decyloxyphenyl 4-(3,7-dimethyloctyloxy)benzoate.

8. The process of claim 1 wherein said electrodes are employed to apply said slowly varying field.

* * * * *